_United States Patent Office_

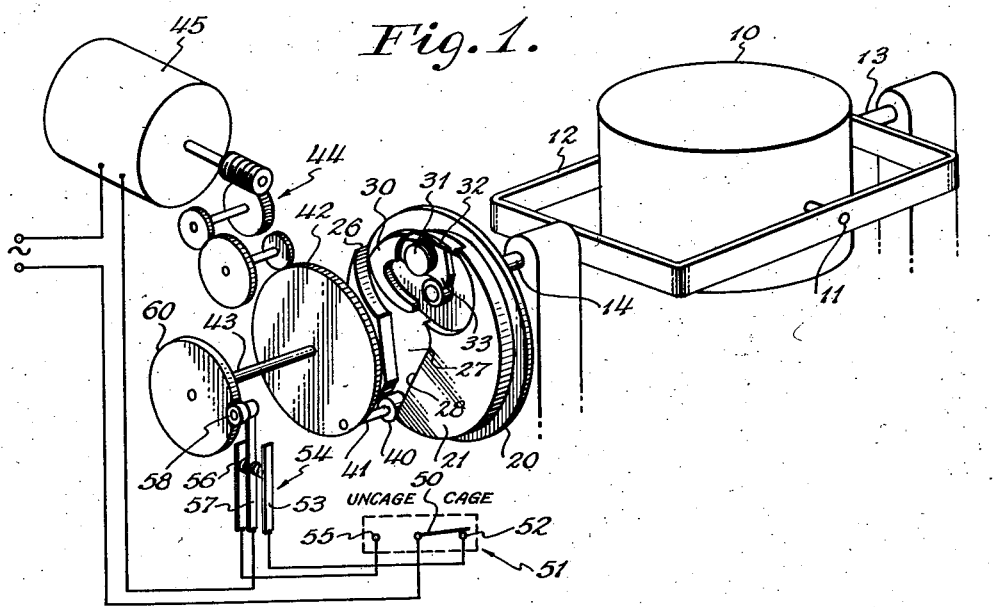

2,799,169
Patented July 16, 1957

2,799,169
CAGING MECHANISMS

George R. Welti, Concord, Mass., assignor to Sperry Rand Corporation, a corporation of Delaware Application December 5, 1952, Serial No. 324,203

8 Claims. (Cl. 74—5.1)

This invention relates to mechanism positioning devices and particularly to such devices when applied as caging mechanisms for gyroscopes.

In the application of gyroscopes to various types of instrumentation, it is frequently required that the gyroscope be caged, i. e., locked in an immobile position. This is done either to prevent damage to the mechanism during an unusual maneuver of the supporting craft, or to restore the gyroscope to a basic reference position from which measurement may be made, or to immobilize the gyroscope when it is not in use.

For applications in which the gyroscope is to be caged about a single axis of rotation or after limited movement about two axes of rotation at right angles, a variety of caging devices have been proposed. As a rule, these devices are quite simple and caging is usually accomplished by movement of a single control element. When a gyroscope is to be caged against movement about a single axis, it is conventional to provide resilient clamping means that act upon an arm secured to the gyroscope mounting means and restore it to a central position. When a gyroscope is to be caged against movement about two axes, it is conventional to provide a cone type cager that co-acts with an arm or extension aligned with the spin axis of the gyroscope. Such a cone shaped device, when depressed to engage the arm, is adequate to move the gyroscope from positions of limited displacement about two axes to its caged position.

In the applications of gyroscopes to more complex types of instrumentation, caging of the gyroscopes becomes an increasingly complicated problem. In many applications it is found necessary or desirable that the gyroscope depart to a considerable degree from its caged or normal position. These applications are particularly apparent in instrumentation applied to high speed and/or highly maneuverable aircraft. In such instances, it is usually found necessary to provide caging devices that restore the gyroscope to a caged position in two steps, namely, first to cage the gyroscope about one axis of rotation and then to cage it about the other.

Devices that have been proposed for these purposes usually consist of camming devices or lever arrangements to align pins on the gyroscope mounting means with pins on the gyroscope supporting frame. As a rule, such devices are cumbersome and slow acting. Furthermore, if they are to be operated from a remote control point, they usually require a reversible motor to effect the caging and uncaging operations, or, if operated by a unidirectional motor, do not provide accurate positioning of the gyroscope. In addition, many are incapable of general application because they cannot be used to restore a gyroscope that is displaced as much as 180 degrees from its normal position without the possibility of caging the gyroscope in an inverted position.

The limitations of known devices are even more apparent when applied to gyroscopes used for instrumentation in the field of sonic and supersonic aircraft and missiles. In these fields the extreme speeds and maneuverability of the supporting craft frequently create conditions in which a reference gyroscope, such as a vertical gyroscope, is required to have complete rotational freedom about two axes at right angles to the spin axis. In addition, it frequently occurs that there is an extremely limited time factor to be considered when the gyroscope is caged or uncaged. For example, in a typical application in which a fighter aircraft is to launch a missile and guide the missile to its target, it is essential that a reference be established on the aircraft to indicate the attitude of the missile at the time of launching, and that this reference be maintained until the missile guidance period is completed.

In such a situation, it is quite probable that the fighter aircraft will be in the course of a turning or rolling maneuver at the time of launching. Thus, if a vertical gyroscope is used as a reference device to indicate the attitude of the missile relative to the aircraft, it is necessary to uncage the gyroscope completely and instantaneously at the time of missile release. If this is not done, it is possible that continued movement of the aircraft in its maneuver would cause interference between the gyroscope mounting means annd the caging means that would result in tumbling the gyroscope, with a consequent loss of the reference position indication. This situation is particularly true with regard to movements of an aircraft about its longitudinal or roll axis, which occur at a rate on the order of three to four times the rate of movements about its transverse or pitch axis.

In addition, it is essential that the caging device be capable of restoring the gyroscope to its normal position, without ambiguity, from any given attitude in order to prepare for the launching of the next missile. Furthermore, since the gyroscope position may be used as a reference basis for certain computations to determine the missile course and the guidance signals to be directed to the missile, it is essential that the gyroscope be caged in a position that can betermined with great accuracy. Finally, to simplify the controls and space requirements for such a device, it is preferred that a unidirectional motor be used for the caging and uncaging operations, and that the entire equipment be compact and easy to adjust.

The principal objects of the present invention are to improve gyroscope caging devices to permit extremely rapid uncaging, to permit rapid and unambiguous caging of the gyroscope regardless of the extent of its displacement from its normal or caged position, to permit extremely accurate positioning of the gyroscope, to permit the use of a unidirectional actuating motor, and to permit a compact construction that is simple to adjust. Other objects of the invention will be apparent in the course of the description.

These objects are attained by the use of a unique cam controlled arrangement that includes a radial or plate cam element having an outer or periphery cam surface of progressively decreasing lead from its outermost or high point to its innermost or low point and an internal groove cam connecting the low point and the high point, and is fixed on the mounting means of the gyroscope for rotation about an axis coincident with an axis of rotation of the gyroscope. Cooperating with the cam is a motor driven actuating element which, in a caging operation, may be brought into engagement with any point on the outer surface of the cam, depending on the extent of displacement of the gyroscope from its normal or caged position. The actuating element is then effective to drive the cam, and thereby rotate the gyroscope mount, until it reaches the low point of the cam. The arrangement is such that at this point the gyroscope mount is positioned substantially in the position it occupies when it is caged. Thereafter, continued rotation of the driving motor is effective to move the actuating element through the internal groove connecting the low point and the high point of the outer cam surface. When the actuating element is positioned within the groove but at the high point of the periphery cam surface, a suitable switching device is effective to stop the driving motor. In this position the actuating element effectively locks the gyroscope mount in its then attained position, which is so adjusted that it constitutes the caged position of the gyroscope.

Inasmuch as the actuating element is at the position of maximum diameter of the cam when the gyroscope is caged, only the slightest amount of movement of the actuating element is then required to disengage the element from the cam groove and thereby uncage the gyroscope. This is accomplished, through the switching device, by restarting the driving motor to drive the actuating element in the same direction as before. As soon as the element is clear of the groove, there is no possibility of interference between the caging mechanism and the gyroscope regardless of the type of maneuver in which the supporting aircraft may be engaged.

Thus, the present invention comprises a device that is capable of restoring a gyroscope mount, without ambiguity, from any position of displacement about an axis of rotation to a caged position that can be determined with a high degree of accuracy, and of uncaging the gyroscope mount substantially instantaneously.

A preferred form of the invention is disclosed in the drawings, in which:

Fig. 1 is a perspective view of the invention applied to the roll axis of a vertical gyroscope, Figs. 2, 3 and 4 disclose the relationship of the several elements of the invention in various positions of operation.

In the embodiment shown in the drawings, the invention is used to cage and uncage a vertical gyroscope of a type that may be employed in an application such as that described above, namely, to provide a reference whereby the relative orientation of a fighter aircraft and a guided missile to be launched therefrom may be maintained in the fighter aircraft after the missile is launched. However, inasmuch as none of the missile launching or guidance system is essential to an understanding of the novel caging mechanism, the problem described is merely mentioned as an illustration, and the present description is limited to the caging mechanism, per se.

Referring to Fig. 1, the rotor of the vertical gyroscope is mounted in a rotor-bearing case or housing 10 in a manner such that the spin axis of the rotor is parallel to the yaw axis of the aircraft when the gyroscope is caged. Housing 10 is supported by mounting means or trunnions 11 that are normally parallel to the pitch axis of the aircraft and are pivotally supported in a gimbal 12 which, in turn, is supported on mounting means or trunnions 13, 14 that are arranged parallel to the roll axis of the aircraft and are rotatably mounted on suitable supports.

Fixed to trunnion 14 is the novel cam element 20 that forms the basis of the present invention. Element 20 comprises a circular blank mounted eccentrically with respect to gimbal 12 with its axis of rotation coincident with the axis of rotation of the gimbal. The cam portion of element 20 comprises two separate cam segments 21 and 22, each having an outer cam surface milled substantially in the form, for example, of an involute curve or any suitable curve such that segment 21 has its high point or point of maximum displacement from the center of rotation, located at 23 and is of progressively decreasing lead to a low point, or point of minimum displacement from its center, at 24. Segment 22 is similarly arranged, having its high point at 25 and its low point at 26. A groove cam 27 extends between segments 21 and 22 and connects the low point of the cam with the high point, thereby providing a passageway for a cam actuating element.

For a purpose to be described hereinafter, a portion of segment 21 is slightly reduced in thickness to accommodate a latch element 30 that is pivoted on a stud 31 and is resiliently urged in a clockwise direction by a suitable spring 32. The arrangement of latch 30 is such that it is normally urged into groove cam 27 by spring 32, but may be rotated about its pivot in a counterclockwise direction to permit the passage of the cam actuating element. An extension 33 on latch 30 abuts a mounting shoulder on the cam to limit the movement of the latch into the groove.

In order to drive cam 20, a cam roller or actuating element 40 is rotatably mounted on a stud 41 in a gear 42 which is fixed on a shaft 43. This shaft is mounted for rotation parallel to the axis of rotation of cam 20 but is offset therefrom whereby actuator 40 rotates in the plane of cam 20 but can engage the cam only during a portion of its movement. Gear 42 is driven through a suitable gear reduction device 44 by a small unidirectional electric motor 45.

To control the operation of motor 45 there is provided a switching device that includes a cam operated switch that effects the energization of the motor as a function of cam position, and a manually operated switch that is settable in accordance with the mode of operation desired, i. e., to "cage" or "uncage." Motor 45 is energized from a suitable power supply, one side of which is connected directly to the motor and the other side to the center pole 50 of a manually operated, single-pole double-throw toggle switch 51, which may be set to either of two positions to initiate either a caging or an uncaging operation. When set to cage, pole 50 is engaged with contact 52 which is connected to a contact 53 of the cam operated switch 54. When set to uncage, pole 50 is engaged with contact 55 which is connected to contact 56 of the cam operated switch. The center pole 57 of switch 54 is connected to motor 45 to complete the caging motor circuit, and is provided with a cam follower 58 that rides on a cam 60 fixed on shaft 43. The contour of cam 60 is such that when follower 58 is engaged with the low dwell of the cam, pole 57 is engaged with contact 56, whereas, when follower 58 rides on the high dwell of the cam, pole 57 is engaged with contact 53.

When the mechanism is in caged position, as illustrated in Figs. 1 and 2, actuating element 40 is preferably so arranged relative to cam 20 that its center is aligned with high points 23 and 25 of segments 21 and 22, respectively. The actuator element 40 situated within the internal groove 27 cooperates with the cam 20 to define the caging position of the device. In addition, the arrangement is such that a straight line passing through points 23 and 25 and the center of actuator 40, in this position, passes directly through the center of shaft 43. Thus, all rotational forces exerted by the gyroscope through cam 20 on actuating element 40, as a result of changes in attitude of the supporting aircraft, are normal to shaft 43 and in the plane of its axis and are completely dissipated by shaft 43. In addition, gear reduction mechanism 44 and motor 45 provide sufficient inertia to prevent actuator 40 from being forced out of engagement with high points 23 and 25, regardless of the frequency or rate of such changes in attitude. Inasmuch as the width of groove 27 at the high point of the cam need only be such as to provide a minimum of clearance for actuator 40, it is apparent that the arrangement thus far described provides a means to cage a gyroscope mount with an extremely high degree of accuracy.

In order to uncage the gyroscope, pole 50 of switch 51 is moved to engage contact 55. This completes the circuit to motor 45 through elements 56 and 57 and causes the motor to drive gear 42. Inasmuch as actuator 40 is at the high point of cam 20 at the start of this operation, the slightest movement of the actuator is effective to clear high points 23 and 25, and it is only necessary to move the actuator a distance slightly in excess of half its diameter to move it completely clear of the cam, as shown in dotted lines in Fig. 2. To this end, the low dwell of cam 60 is formed of sufficient length to obtain the required movement. As soon as roller 58 rides onto the high dwell of cam 60, pole 57 is disengaged from contact 56 and engaged with contact 53. This breaks the circuit of the driving motor by way of contact 56 and, since pole 50 of switch 51 is disengaged from contact 52 at this time, the driving motor is stopped as soon as the uncaging operation is complete.

Thus, by causing the actuator to cage the gyroscope when it is engaged with the high point of the cam, it is possible to obtain an extremely rapid uncaging action that eliminates the possibility of interference between the gyroscope and the caging mechanism regardless of the type of maneuver in which the supporting aircraft may be engaged at the time. Obviously, the length of the low dwell of cam 60 may be varied, at will, to cause the actuator to stop at any desired position in preparation for the succeeding caging operation.

When it is desired to cage the gyroscope, pole 50 is shifted to engage contact 52 (as in Fig. 1). Inasmuch as roller 58 is now on the high dwell of cam 60, the circuit to motor 45 is completed through elements 53 and 57, and gear 42 is again driven by the motor. When a caging operation is initiated, the gyroscope may be in any position about its axis of rotation, as in Fig. 3. When actuator 40 engages cam segment 21 (or segment 22), it is effective to drive the cam clockwise (or counterclockwise) until it reaches low point 24. At this point, the gyroscope is substantially in its caged position but motor 45 is still energized. Thus, actuator 40 continues its movement into groove cam 27, at the same time camming latch 30 about stud 31 against the tension of spring 32. The actuator continues to move through the cam groove until it is positioned between high points 23 and 25 of segments 21 and 22. The length of the high dwell on cam 60 is such that at this point roller 58 rides into the low dwell of the cam thereby breaking the circuit to motor 45 and stopping the parts in their then attained, or caged, position, as in Fig. 1. This structure provides a means for deactivating the actuator element 40 with the element and cam 20 in the caging position.

Thus, by the use of a unidirectional motor and the cam arrangement disclosed, it is possible to restore a gyroscope mount to a caged position, without ambiguity, from any position it may be in at the time the caging operation is initiated.

As a general proposition, groove cam 27 need only be of sufficient width to accommodate actuator 40. However, to take care of the situation in which the gyroscope is in such position that actuator 40 would enter the groove at the high point of the cam when a caging operation is initiated, it is necessary to widen the cam groove slightly, as at 28, to permit unimpeded movement of the parts as gear 42 rotates. This widened portion permits the actuator to remain engaged with the cam groove to rotate the cam and then travel back through the groove to arrive at the high point at the time the parts reach the caged position.

The outer surfaces of segments 21 and 22 are such that actuator 40 provides a positive driving force thereon during the entire time that the parts are engaged. However, during its passage through groove cam 27 actuator 40 is not always in positive engagement with an inner surface of the groove. When this occurs, it is conceivable that relative movement of the gyroscope, caused by some motion of the supporting aircraft, may cause rotation of the cam independently of the actuator and cause the cam groove to be disengaged from the actuator. If this occurs, it is apparent that actuator 40 could reach its caged position, at which point it would be stopped by the caging motor, but that the cam would not be engaged therewith.

To prevent this occurrence, spring 32, biasing latch 30 in a clockwise direction, causes latch 30 (see Fig. 4) to block the cam groove at the low point of the cam as soon as actuator 40 passes into the groove. With this arrangement, even though there is retrograde movement of the gyroscope, the actuator cannot pass out of the cam groove, and continued operation of the driving motor causes the actuator ultimately to locate the cam in its proper caged position.

Thus far, the description is limited to a caging device that is suitable to cage any kind of gyroscope about a single axis of rotation. With the vertical gyroscope shown in the drawings, it is also necessary to effect caging about its pitch axis before it can be said that the gyroscope is completely caged. Obviously, a caging device similar to that already described could be applied to the gyroscope mount or trunnion 11 to cage the gyroscope about its pitch axis. In this event, it would be necessary to provide suitable sequence switching means whereby, in a caging operation, caging would be accomplished first about the roll axis and then about the pitch axis, and, in an uncaging operation, uncaging would be effected on both axes simultaneously.

In a practical application of the invention, such as that mentioned above, any suitable means may be employed to obtain a continuous measure of the gyroscope position about each axis of rotation, when it is uncaged, for use as a reference in other parts of the over-all system. For example, if a synchro resolver or synchro signal generator is employed, its rotor may be fixed on trunnion 13 and its stator fixed relative to the aircraft with suitable excitation voltages applied to its windings. Then, when the gyroscope is uncaged, any movement about its roll axis produces a change in voltage output that may be used as a signal to determine the roll orientation of a missile launched at the time the gyroscope was uncaged. In addition, toggle switch 51 may be arranged to be shifted in its "uncage" position conjointly with the operation of a missile launching switch, and to its "cage" position conjointly with the operation of a resetting switch that functions to restore the system to the condition required to launch another missile.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A device for caging a gyroscope about an axis comprising mounting means for the gyroscope movable about the axis, a cam fixed to the mounting means movable about the axis of the gyroscope having an outer cam surface of progressively decreasing lead from its high point to its low point and an internal groove connecting the low point and the high point, an element for activating said cam cooperating with said internal groove and movable in a continuous path from any position on the outer cam surface to a caging position within the internal groove, and means for deactivating said element with the element and cam in the caging position.

2. A device of the character claimed in claim 1, in which the caging position of the element is at the end of the internal groove at the high point of the cam.

3. The combination comprising a gyroscope including a rotor-bearing case, mounting means for supporting the case for rotation about an axis, and a caging device for the gyroscope, said caging device comprising a cam fixed to the mounting means and having its axis of rotation coaxial with said axis of rotation of the gyroscope, an actuating element for the cam, said cam having an outer cam surface of progressively decreasing lead from its high point to its low point and an internal groove for the actuating element connecting the low point and the high point whereby there is a continuous path for the actuating element from any point on the outer cam surface to the end of the groove at the high point of the cam, and operating means to move the actuating element in driving engagement with the cam.

4. The combinating comprising a gyroscope including a rotor-bearing case, mounting means for supporting the case for rotation about an axis, and a caging device for the gyroscope, said caging device comprising a cam fixed to the mounting means and having its axis of rotation coaxial with said axis of rotation of the gyroscope, an actuating element for the cam, said cam having an outer cam surface of progressively decreasing lead from its high point to its low point and an internal groove for the actuating element connecting the low point and the high point whereby there is a continuous path for the actuating element from any point on the outer cam surface to the end of the groove at the high point of the cam, operating means to move the actuating element in driving engagement with the cam, and means to stop the operation of the operating means when the actuating element is positioned in the groove at the high point of the cam.

5. The combination comprising a gyroscope including a rotor-bearing case, mounting means for supporting the case for rotation about an axis, and a caging device for the gyroscope, said caging device comprising a cam fixed to the mounting means and having its axis of rotation coaxial with said axis of rotation of the gyroscope, an actuating element for the cam, said cam having an outer cam surface of progressively decreasing lead from its high point to its low point and an internal groove for the actuating element connecting the low point and the high point whereby there is a continuous path for the actuating element from any point on the outer cam surface to the end of the groove at the high point of the cam, operating means to move the actuating element in driving engagement with the cam until the actuating element is positioned in the groove at the high point of the cam, and means operative when the actuating element is in the groove to prevent retrograde movement of the cam.

6. The combination comprising a gyroscope including a rotor-bearing case, mounting means for supporting the case for rotation about an axis, and a caging device for the gyroscope, said caging device comprising a cam fixed to the mounting means and having its axis of rotation coaxial with said axis of rotation of the gyroscope, an actuating element for the cam, said cam having an outer cam surface of progressively decreasing lead from its high point to its low point and an internal groove for the actuating element connecting the low point and the high point whereby there is a continuous path for the actuating element from any point on the outer cam surface to the end of the groove at the high point of the cam, operating means to move the actuating element in driving engagement with the cam, means operative when the actuating element is in the groove to prevent retrograde movement of the cam, and means to stop the operation of the operating means when the actuating element is positioned in the groove at the high point of the cam.

7. The combination comprising a gyroscope including a rotor-bearing case, mounting means for supporting the case for rotation about an axis, and a caging device for the gyroscope, said caging device comprising a cam fixed to the mounting means and having its axis of rotation coaxial with said axis of rotation of the gyroscope, an actuating element for the cam, said cam having an outer cam surface of progressively decreasing lead from its high point to its low point and an internal groove for the actuating element connecting the low point and the high point whereby there is a continuous path for the actuating element from any point on the outer cam surface to the end of the groove at the high point of the cam, operating means to move the actuating element into and out of driving engagement with the cam, and means to control the operation of the operating means.

8. The combination comprising a gyroscope including a rotor-bearing case, mounting means for supporting the case for rotation about an axis, and a caging device for the gyroscope, said caging device comprising a cam fixed to the mounting means and having its axis of rotation coaxial with said axis of rotation of the gyroscope, an actuating element for the cam, said cam having an outer cam surface of progressively decreasing lead from its high point to its low point and an internal groove for the actuating element connecting the low point and the high point whereby there is a continuous path for the actuating element from any point on the outer cam surface to the end of the groove at the high point of the cam, operating means to move the actuating element into and out of driving engagement with the cam, and settable means to control the operation of the operating means, said last recited means including a first element settable to either of two positions to initiate the operation of the operating means, and a second element movable to a first position to stop the operation of the operating means when the actuating element is positioned in the groove at the high point of the cam and to a second position to stop the operation of the operating means when the actuating element is out of engagement with the cam.

References Cited in the file of this patent

UNITED STATES PATENTS

| | | |
|---|---|---|
| 2,507,451 | Molnar | May 9, 1950 |
| 2,580,748 | Fillebrown | Jan. 1, 1952 |
| 2,591,741 | Stone | Apr. 8, 1952 |